US008610704B2

(12) United States Patent
Yun et al.

(10) Patent No.: US 8,610,704 B2
(45) Date of Patent: Dec. 17, 2013

(54) DISPLAY DEVICE AND CONTROL METHOD OF THE SAME

(75) Inventors: Jin-man Yun, Seongnam-si (KR); Yeun-mo Yeon, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 1248 days.

(21) Appl. No.: 11/930,548

(22) Filed: Oct. 31, 2007

(65) Prior Publication Data

US 2008/0211802 A1 Sep. 4, 2008

(30) Foreign Application Priority Data

Mar. 2, 2007 (KR) ........................ 10-2007-0020729

(51) Int. Cl.

*G06F 3/038* (2013.01)
*G09G 5/00* (2006.01)
*G09G 3/36* (2006.01)
*G09G 5/10* (2006.01)

(52) U.S. Cl.

USPC ............... 345/214; 345/87; 345/94; 345/102; 345/690; 345/691

(58) Field of Classification Search

USPC .......................................................... 345/214
See application file for complete search history.

(56) References Cited

U.S. PATENT DOCUMENTS

| | | | | |
|---|---|---|---|---|
| 7,940,240 | B2 * | 5/2011 | Takeuchi et al. | 345/94 |
| 2002/0084959 | A1 | 7/2002 | Park et al. | |
| 2003/0142118 | A1 * | 7/2003 | Funamoto et al. | 345/691 |
| 2006/0262057 | A1 * | 11/2006 | Sumiyoshi | 345/87 |
| 2006/0284897 | A1 * | 12/2006 | Shen et al. | 345/690 |
| 2008/0129677 | A1 * | 6/2008 | Li et al. | 345/102 |

FOREIGN PATENT DOCUMENTS

| | | | |
|---|---|---|---|
| CN | 1413015 | | 4/2003 |
| CN | 1737652 | | 2/2006 |
| CN | 1757052 | A | 4/2006 |
| CN | 1848230 | | 10/2006 |
| CN | 1917573 | | 2/2007 |
| CN | 101071543 | A | 11/2007 |
| JP | 07146467 | | 6/1995 |
| JP | 2000098980 | | 4/2000 |
| JP | 2001075525 | | 3/2001 |
| JP | 2002169514 | | 6/2002 |
| JP | 2002215116 | | 7/2002 |
| JP | 2002229507 | | 8/2002 |
| JP | 2004012655 | | 1/2004 |
| JP | 2004145176 | | 5/2004 |
| JP | 2005049784 | | 2/2005 |
| KR | 100266212 | B1 | 9/2000 |
| KR | 1020020056710 | | 7/2002 |
| KR | 1020040029759 | A | 4/2004 |
| KR | 1020040057147 | | 7/2004 |
| KR | 1020050046143 | | 5/2005 |
| TW | 226949 | | 1/2005 |

* cited by examiner

*Primary Examiner* — Charles V Hicks
(74) *Attorney, Agent, or Firm* — Cantor Colburn LLP

(57) ABSTRACT

A display device includes a display panel which includes a plurality of pixels in a matrix form, an image signal comparator which compares image signals corresponding to at least two successive frames and increases a count value if a proportion of the image signals that are the same as each other exceeds a preset critical value, and a panel driver which drives the display panel to display a non-image signal on at least a part of the display panel during at least one frame if the count value reaches a preset instruction value.

20 Claims, 8 Drawing Sheets

FIG. 3

| IMAGE SIGNAL COMPARING UNIT | COUNT NUMBER | DISPLAY PANEL |
|---|---|---|
| 1ST FRAME<br>2ND FRAME<br>3RD FRAME } COMPARISON | 1 | IMAGE SIGNAL |
| 2ND FRAME<br>3RD FRAME<br>4TH FRAME } COMPARISON | 2 | IMAGE SIGNAL |
| 3RD FRAME<br>4TH FRAME<br>5TH FRAME } COMPARISON | 3 | IMAGE SIGNAL |
| ⋮ | | |
| 30TH FRAME<br>31TH FRAME<br>32TH FRAME } COMPARISON | 30(1ST INSTRUCTION VALUE) | NON-IMAGE SIGNAL |
| 31TH FRAME<br>32TH FRAME<br>33TH FRAME } COMPARISON | 31 | NON-IMAGE SIGNAL |
| 32TH FRAME<br>33TH FRAME<br>34TH FRAME } COMPARISON | 32 | NON-IMAGE SIGNAL |
| ⋮ | | |
| 60TH FRAME<br>61TH FRAME<br>62TH FRAME } COMPARISON | 60(2ND INSTRUCTION VALUE) | NON-IMAGE SIGNAL |
| 61TH FRAME<br>62TH FRAME<br>63TH FRAME } COMPARISON | 61 | NON-IMAGE SIGNAL |
| ⋮ | | |
| 75TH FRAME<br>76TH FRAME<br>77TH FRAME } COMPARISON | 75(3RD INSTRUCTION VALUE) | IMAGE SIGNAL |
| 76TH FRAME<br>77TH FRAME<br>78TH FRAME } COMPARISON | 1 | IMAGE SIGNAL |

DISPLAY DEVICE AND CONTROL METHOD OF THE SAME

This application claims priority to Korean Patent Application No. 10-2007-0020729, filed on Mar. 2, 2007, and all the benefits accruing therefrom under 35 U.S.C. §119, the contents of which in its entirety are herein incorporated by reference.

BACKGROUND OF THE INVENTION

1. Field of the Invention

The present invention relates to a display device and a control method of the same, and more particularly, to a display device which displays a still image and a control method of the same.

2. Description of the Related Art

A display device, such as a liquid crystal display ("LCD") device and an organic light emitting diode ("OLED") device, employs a thin film transistor ("TFT") substrate as a circuit board to drive each pixel independently. The TFT substrate includes a gate line to transmit a scan signal and a data line to transmit a data signal. Further, the TFT substrate includes a TFT connected to the gate line and the data line, a pixel electrode connected to the TFT, etc. The display device includes a gate driver to turn on/off the TFT and a data driver to apply a gray scale voltage corresponding to an image. The drivers are input with various kinds of control signals from a timing controller.

A display device used for public information often displays the same image signal for a long time. If a still image is displayed for long, an afterimage is formed on a display panel, thereby deteriorating an image quality.

BRIEF SUMMARY OF THE INVENTION

The present invention provides a display device where an afterimage sticking is improved and a control method of the same.

Exemplary embodiments of the present invention provide a display device including a display panel which includes a plurality of pixels in a matrix form, an image signal comparator which compares image signals corresponding to at least two successive frames and increases a count value if a proportion of the image signals that are the same as each other exceeds a preset critical value, and a panel driver which drives the display panel to display a non-image signal on at least a part of the display panel during at least one frame if the count value reaches a preset instruction value.

The instruction value may include a first instruction value and a second instruction value which is higher than the first instruction value, and the panel driver may drive the display panel to display a non-image signal in one of an odd-numbered pixel row and an even-numbered pixel row if the count value reaches the first instruction value and drives the display panel to display a non-image signal in the other of the odd-numbered pixel row and the even-numbered pixel row if the count value reaches the second instruction value.

The display panel may include a liquid crystal display ("LCD") panel having a substantially rectangular shape, the display device further including a plurality of lamps disposed behind the liquid crystal display panel to provide light to the liquid crystal display panel, and the lamps extend in a substantially perpendicular direction to the pixel rows.

The instruction value may include a first instruction value and a second instruction value which is higher than the first instruction value, and the panel driver may drive the display panel to display a non-image signal in one of an odd-numbered pixel line and an even-numbered pixel line if the count value reaches the first instruction value and the other of the odd-numbered pixel line and the even-numbered pixel line if the count value reaches the second instruction value.

The display panel may include an LCD panel having a substantially rectangular shape, the display device further including a plurality of lamps disposed behind the LCD panel to provide light to the LCD panel, and the lamps extend in a substantially perpendicular direction to the pixel lines.

The preset instruction value may further includes a third instruction value which is higher than the second instruction value, and the image signal comparator may reset the count value if the count value reaches the third instruction value.

Alternatively, the image signal comparator may reset the count value after the non-image signal is displayed on the display panel according to the second instruction value.

A polarity of a data signal applied to the pixels may be changed differently every frame, and the panel driver may drive the display panel to display the non-image signal on the display panel during two successive frames if the count value reaches the instruction value.

The display device may further include a memory which stores image signals corresponding to successive frames, such as three successive frames. The display device may display an image using an overdriving method, an underdriving method, or a pretilt driving method, and the image signals corresponding to successive frames may be stored in the memory for the driving method of the display device and for the image signal comparator.

The non-image signal may include a black or gray signal.

The display panel may include a liquid crystal layer in a normally black mode, and the panel driver may not apply an image signal to at least a part of the display panel during at least one frame if the count value reaches the instruction value.

Other exemplary embodiments of the present invention include a control method of a display device which includes a display panel which includes a plurality of pixels in a matrix form, the control method including comparing image signals corresponding to at least two successive frames to determine whether they are the same, increasing a count value if a proportion of the image signals that are the same exceeds a preset critical value as a result from comparison, and displaying a non-image signal on at least a part of the display panel during at least one frame, which may occur when the count value reaches a preset instruction value.

The instruction value may include a first instruction value and a second instruction value which is higher than the first instruction value, and displaying the non-image signal may include displaying a non-image signal in one of an odd-numbered pixel row and an even-numbered pixel row if the count value reaches the first instruction value and displaying a non-image signal in the other of the odd-numbered pixel row and the even-numbered pixel row if the count value reaches the second instruction value.

The instruction value may include a first instruction value and a second instruction value which is higher than the first instruction value, and displaying the non-image signal may include displaying a non-image signal in one of an odd-numbered pixel line and an even-numbered pixel line if the count value reaches the first instruction value and displaying a non-image signal in the other of the odd-numbered pixel line and the even-numbered pixel line if the count value reaches the second instruction value.

The instruction value may further include a third instruction value which is higher than the second instruction value, and the control method may further include resetting the count value if the count value reaches the third instruction value.

The control method may further include resetting the count value after the non-image signal is displayed on the display panel according to the second instruction value.

Displaying the non-image signal may include displaying a black or gray on at least a part of the display panel.

The display panel may include a liquid crystal layer in a normally black mode, and displaying the non-image signal may include not displaying an image signal on at least a part of the display panel during at least one frame.

BRIEF DESCRIPTION OF THE DRAWINGS

The above and/or other aspects, features, and advantages of the present invention will become apparent and more readily appreciated from the following description of the exemplary embodiments, taken in conjunction with the accompanying drawings, in which:

FIG. 3 illustrates a display of a non-image signal depending on a count value of an exemplary image signal comparator according to the first exemplary embodiment of the present invention;

DETAILED DESCRIPTION OF THE INVENTION

Figure 1:
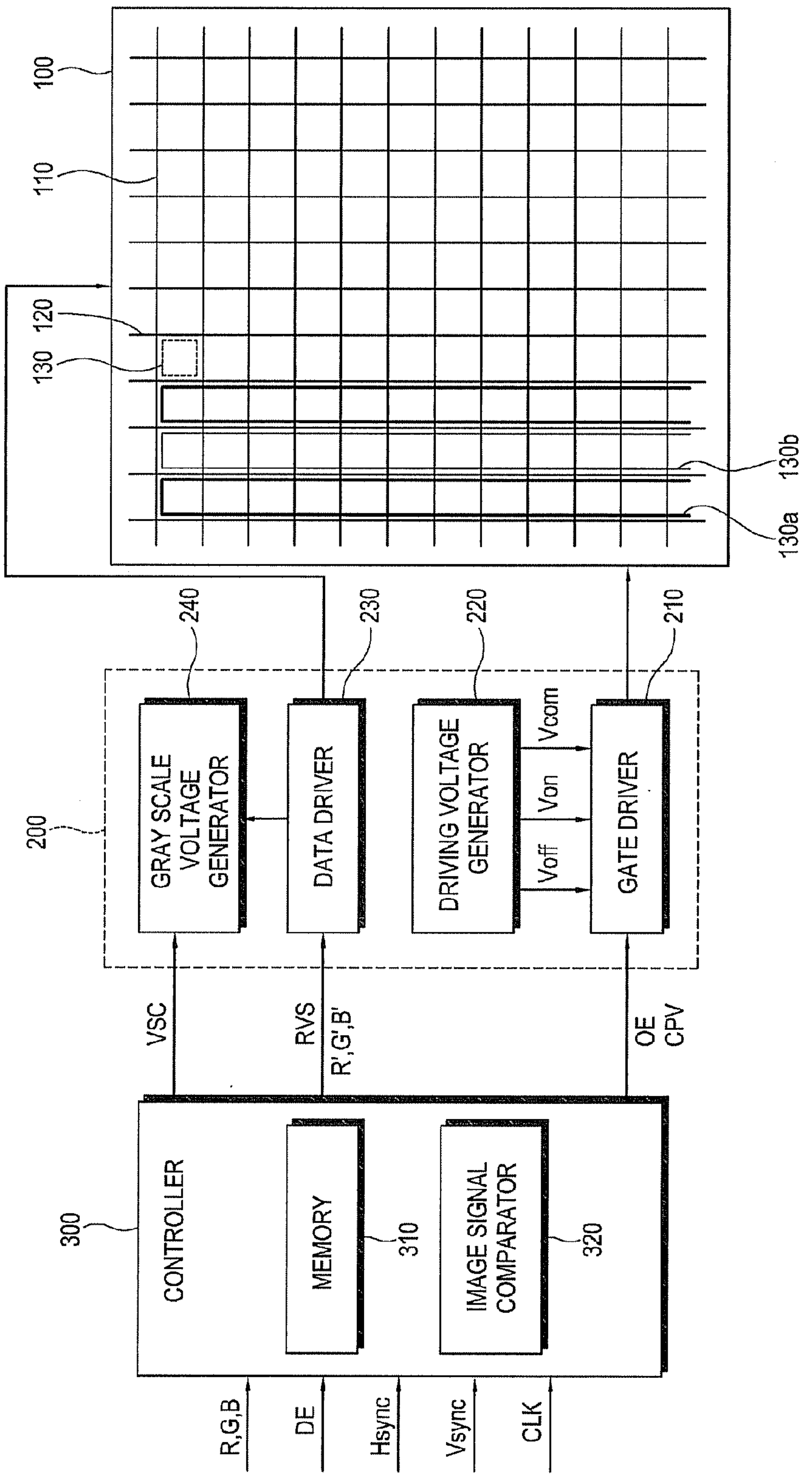
FIG. 1 is a schematic view of an exemplary display device according to a first exemplary embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to perspective illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention. Referring to FIG. 1, a display device according to a first exemplary embodiment includes a display panel 100 which is substantially rectangle-shaped and formed with a plurality of pixels 130, a panel driver 200 to drive the display panel 100 and a controller 300 to control the panel driver 200.

The pixels 130 are formed on the display panel 100 and arranged in a matrix form. The display panel 100 includes a plurality of gate lines 110 extending in a first direction and a plurality of data lines 120 extending in a second direction, the second direction substantially perpendicular to the first direction. In one exemplary embodiment, a pixel 130 may be defined by a gate line 110 and a data line 120. Each pixel 130 includes a TFT (not shown) connected to a corresponding gate line 110 and a corresponding data line 120 and a pixel electrode (not shown) connected to the TFT and displays an image on the display panel 100 according to a gate signal and a data signal from the panel driver 200. Further, the display panel 100 displays a non-image signal on the odd-numbered pixel row 130*a* and/or the even-numbered pixel row 130*b* during a specific frame according to control by the panel driver 200. As will be further described below, the non-image signal is displayed to improve an afterimage due to a still image signal.

The display panel 100 according to the present exemplary embodiment is provided as an LCD panel which includes a first substrate where TFTs are formed, a second substrate which faces the first substrate, and a liquid crystal layer interposed between the first and second substrates. A color filter layer provided corresponding to the pixel electrode may be formed on the first substrate or the second substrate. If the display panel 100 is provided as an LCD panel, the display device further includes a backlight unit (see FIG. 6) to provide light to the liquid crystal layer.

The panel driver 200 includes a gate driver 210, a driving voltage generating unit 220, a data driver 230 and a gray scale voltage generating unit 240 and drives the display panel 100 according to image signals and control signals from a controller 300.

The driving voltage generating unit 220 generates a gate-on voltage Von to turn on the TFTs in the first substrate, a gate-off voltage Voff to turn off the TFTs, a common voltage Vcom to be applied to a common electrode (not shown) in the second substrate, etc.

The gray scale voltage generating unit 240 generates a plurality of gray scale voltages related to brightness of the display device.

The gate driver 210, which may also be called a scan driver, applies a gate signal including a combination of the gate-on voltage Von and the gate-off voltage Voff from the driving voltage generating unit 220 to the gate line 110.

The data driver 230, which may also be called a source driver, is supplied with the gray scale voltages from the gray scale voltage generating unit 240 and selects one of them according to control by the controller 300 to apply it to the data line 120 as a data signal.

The controller 300 includes a memory 310 and an image signal comparator 320. The controller 300 is input with an image signal and a control signal from the outside and provides them to the panel driver 200. The controller 300 is provided with a gray scale signal RGB, i.e., red, green and blue, and an input control signal to control the RGB gray scale signal from an outside graphic controller, e.g., a vertical synchronizing signal Vsync, a horizontal synchronizing signal Hsync, a main clock signal CLK, a data enable signal DE, etc. The controller 300 generates a gate control signal, a data control signal and a voltage selection control signal VSC based on the input control signal and converts a gray scale signal RGB from the outside to be suitable for an operation condition of the LCD panel 100. Then, the controller 300 applies the gate control signal to the gate driver 210, the data control signal and a converted gray scale signal R'G'B' to the data driver 230, and the voltage selection control signal VSC to the gray scale voltage generating unit 240.

The gate control signal includes a vertical synchronization start signal STV to direct a start to output a gate-on pulse, i.e., an area of high gate signal, a gate clock signal CPV to control an output time of the gate-on pulse, a gate on enable signal OE to define the width of the gate-on pulse, etc. The data control signal includes a horizontal synchronization start signal STH to direct a start to input a gray scale signal, a load signal LOAD or TP to apply a data voltage Vd to the data line 120, a reverse control signal RVS to reverse a polarity of a data voltage, a data clock signal HCLK, etc.

A memory 310, such as an electrically erasable and programmable read only memory ("EEPROM") or the like, stores different kinds of data to drive the display panel 100. The memory 310 stores an image signal from the outside by the frame. In particular, the memory 310 stores image signals corresponding to a plurality of successive frames. The image signals corresponding to the successive frames are used for a basic data to compensate for a data signal applied to the display panel 100 and provided to determine whether a non-image signal is applied. For example, the memory 310 may store image signals corresponding to two successive frames or three successive frames.

Liquid crystals in the LCD panel 100 change their alignment in response to a data signal applied to the pixel 130. However, if the liquid crystals do not respond quickly, an image is not displayed properly. In order to improve a response speed of the liquid crystals, the display panel 100 may be driven by an overdriving or underdriving method where a data signal corresponding to a higher or lower gray level than one to be originally displayed is applied to the pixel 130. In this overdriving or underdriving method, a data signal is adjusted by comparing image signals corresponding to two successive frames or the display panel 100 may be driven by a pretilt driving method by comparing image signals corresponding to three successive frames.

The image signal comparator 320 compares image signals corresponding to a plurality of successive frames stored in the memory 310 to determine whether they are the same. Then, if a proportion of the same image signals exceeds a preset critical value, a count value is increased.

Figure 2:
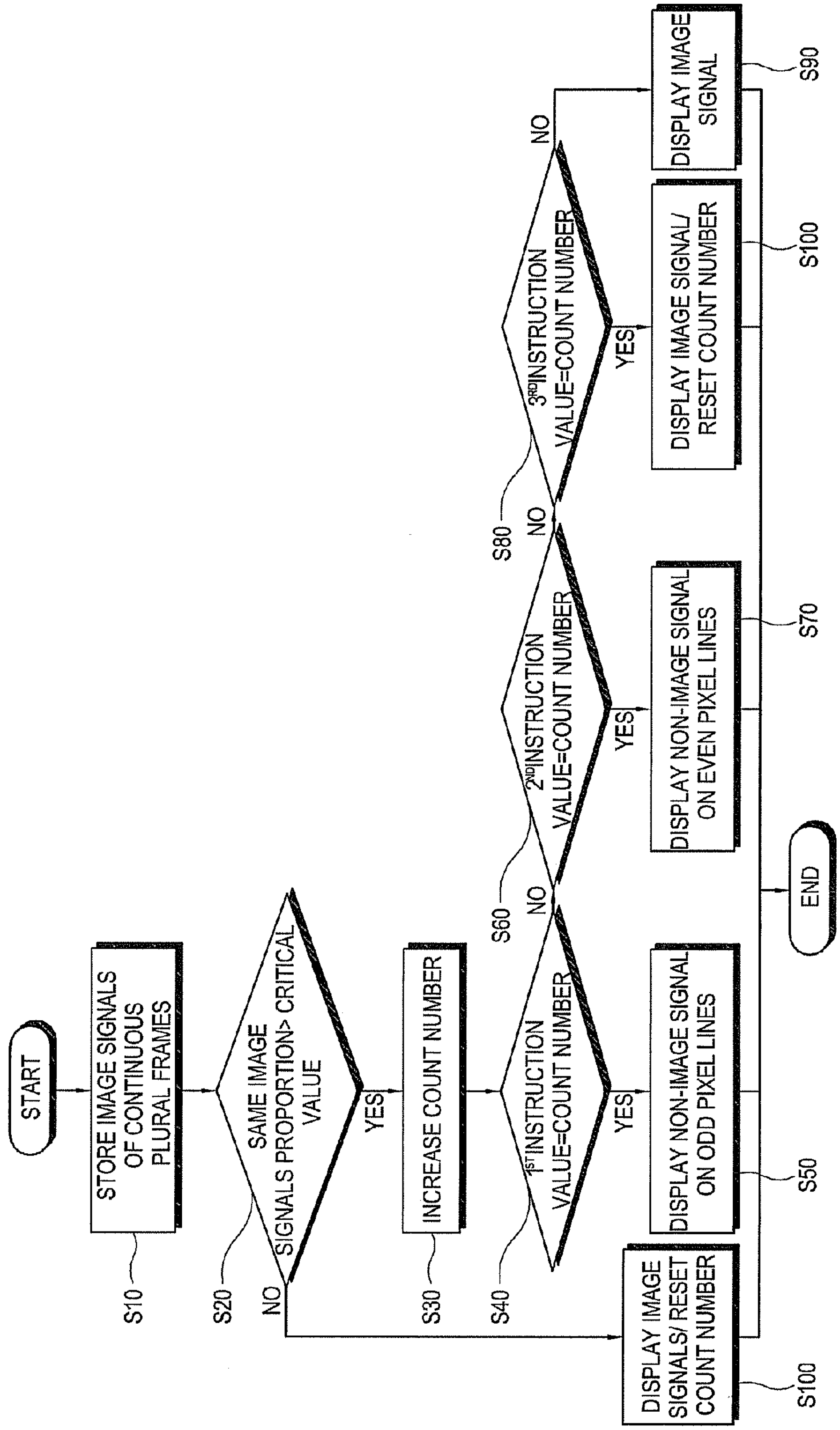
FIG. 2 is a flow chart to illustrate an exemplary control method of the exemplary display device according to the first exemplary embodiment of the present invention.

FIG. 2 is a flow chart to illustrate an exemplary control method of the exemplary display device according to the first exemplary embodiment, and FIG. 3 illustrates a display of a non-image signal depending on a count value of the exemplary image signal comparator 320 according to the first exemplary embodiment of the present invention. Referring to FIGS. 2 and 3, an exemplary control method to display a non-image signal will be described as follows.

First, image signals corresponding to a plurality of successive frames are stored (S10). In the present exemplary embodiment, image signals corresponding to three successive frames are sequentially stored in the memory 310, and an image signal corresponding to a new frame is downloaded in an area where an image signal corresponding to a prior frame is stored. As described above, the display device which displays an image using the overdriving or underdriving method does not need an additional memory but may use the same memory 310.

Then, the image signal comparator 320 compares the image signals corresponding to the three successive frames and determines whether a proportion of the same image signals exceeds a critical value (S20). A display device used for outdoor advertising or in public places such as a stock company, a hospital, an airport, a bus terminal, etc. tends to display the same image signal for a long time. When the same image signal is displayed for an extended period of time, an afterimage may be generated on a display panel of a conventional display device because of a long still image and liquid crystals may not properly respond to a changed image signal. However, in the present exemplary embodiment, a non-image signal is interposed between image signals to reduce an afterimage, and the image signal comparator 320 determines a proportion of the same still image to decide whether or not to interpose a non-image signal.

A critical value may be selected and set by a user to have various values such as 50%, 30%, 70%, etc. A non-image signal may be applied to the display panel 100 not only when a still image is displayed on an entire screen but also when a still image is displayed on a specific part of the screen.

If the proportion of the same image signal is more than a critical value, then the image signal comparator 320 increases a count value (S30), which may also be termed a count number. Under a critical value of 50%, for example, the image signal comparator 320 compares image signals corresponding to first to third frames. Then, if a proportion of the same image signal is over 50%, the count value increases to 1, as shown in FIG. 3. At this point, an image signal corresponding to the first frame is displayed on the display panel 100.

Then, the image signal comparator 320 determines whether the count value is equal to a first instruction value (S40). If the count value is not equal to the first instruction value, then the image signal comparator 320 sequentially determines whether the count value is equal to a second instruction value and a third instruction value (S60 and S80). The second instruction value is set higher than the first instruction value, and the third instruction value is set higher than the second instruction value. If the count value is less than the first, second and third instruction values, then an image is normally displayed (S90), and the image signal comparator 320 determines whether the image signals are the same again. In the present exemplary embodiment with reference to FIG. 3, the first instruction value is set to 30, and thus the image signal comparator 320 compares the image signals corresponding to the successive frames to increase the count value to 30.

In this process, if the count value increases to reach the first instruction value, then the panel driver 200 drives the display panel 100 to display a non-image signal in an odd-numbered pixel row 130*a* and an image signal in an even-numbered pixel row 130*b* (S50). In one exemplary embodiment, the pixel rows 130*a* and 130*b* indicate pixels arranged along a shorter side of the display panel 100. Referring to FIG. 3, while image signals corresponding to the 30th frame are displayed, an image signal is normally displayed in the even-numbered pixel row 130*b* and a non-image signal is displayed in the odd-numbered pixel row 130*a*. A non-image signal refers to a black or gray signal, i.e., a data signal which is low in the gray level. The data driver 230 generates a data signal which is low in the gray level and applies it to the odd-numbered pixel row 130*a*.

The display panel 100 may be driven by an impulsive driving method due to a black or gray signal as a non-image signal, thereby reducing an afterimage caused by a long still image.

Also, the panel driver 200 applies a non-image signal to the display panel 100 for two successive frames. As described above, the control signal output to the data driver 230 through the controller 300 includes the reverse control signal RVS, and the reverse control signal RVS changes a polarity of a data voltage applied to the pixel 130 by the frame. Thus, a non-image signal is displayed for two successive frames to display a non-image signal under both polarities of a data signal. A non-image signal is displayed separately both in a positive polarity of a data signal and in a negative polarity thereof, thereby further reducing an afterimage. Accordingly, a black or gray signal is displayed in the odd-numbered pixel row 130*a* during the 30th frame and the 31st frame.

If the count value increases to reach the second instruction value, which, by example may be set to 60, the panel driver 200 drives the display panel 100 to display a non-image signal in the even-numbered pixel row 130*b* (S70). That is, a non-image signal is alternately displayed in the odd-numbered pixel row 130*a* and in the even-numbered pixel row 130*b* accordingly as the count value reaches the first instruction value or the second instruction value.

Then, if the count value exceeds the second instruction value to reach the third instruction value, which, by example may be set to 75, the image signal comparator 320 resets the count value to be initialized and, at the same time, the panel driver 200 normally applies an image signal to the display panel 100 (S100). In the present exemplary embodiment, the third instruction value is set to 75. In comparing image signals corresponding to the 76th to the 78th frames, if a portion of the same image signals is over 50%, the count value returns to 1. If the same image signals are successively repeated, an algorithm to apply a non-image signal every specific frame is repeated. As described above, if the count value is different from the third instruction value, the display panel 100 normally displays an image signal (S90).

On the other hand, as a result from comparison of the image signals to three frames, if a proportion of the same image signal is not over a critical value, an image signal is normally applied to the display panel 100 and the count value is reset (S100). That is, a frame which has a different image signal from a previous frame is displayed, and then the image signal comparator 320 increases the count value anew.

In an alternative exemplary embodiment, a non-image signal may be applied to the even-numbered pixel row 130*b* first when the count value reaches the first instruction value and to the odd-numbered pixel row 130*a* when the count value reaches the second instruction value.

Figure 4:
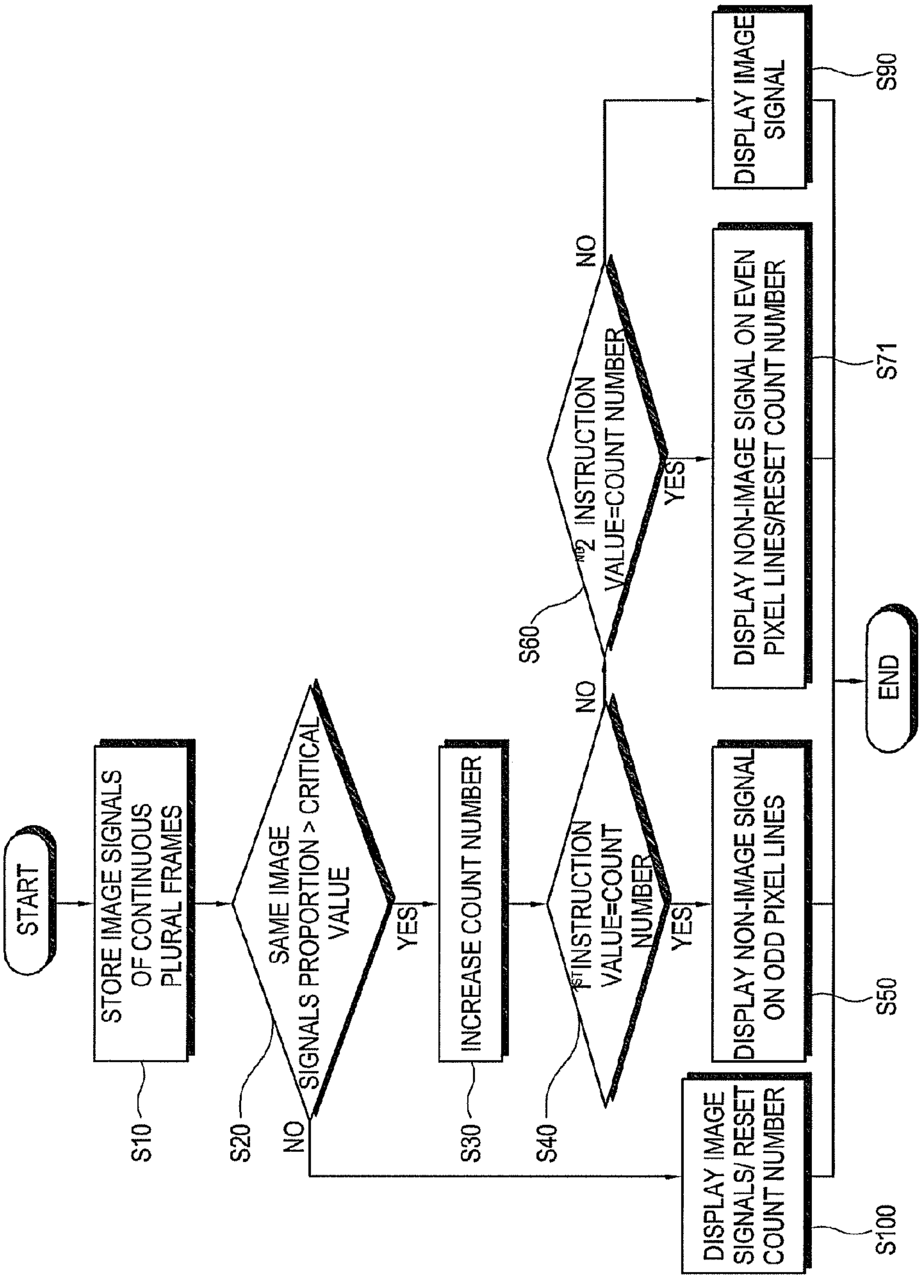
FIG. 4 is a flow chart to illustrate another exemplary control method of the exemplary display device according to the first exemplary embodiment of the present invention.

FIG. 4 is a flow chart to illustrate another exemplary control method of the exemplary display device according to the first exemplary embodiment. In the control method illustrated in FIG. 4, operations S10 to S50 and operation S100 are the same as those illustrated in FIG. 2, but an instruction value includes only first and second instruction values. That is, a panel driver 200 displays a non-image signal in an even-numbered pixel row 130*b* when the count value reaches the second instruction value, and then an image signal comparator 320 resets the count value (S71). According to this control method, a non-image signal is displayed on a display panel 100 every 30 frames. If the count value is not equal to the first and second instruction values, an image signal is normally displayed on the display panel 100 (S90), and the image signal comparator 320 determines anew whether a proportion of the same image signal is out of a critical value (S20).

The number of instruction values and a specific value of instruction values may be set variously depending on a response speed of liquid crystals in the display device, a size of the display panel 100, and a performance of the panel driver 200.

Figure 5A:
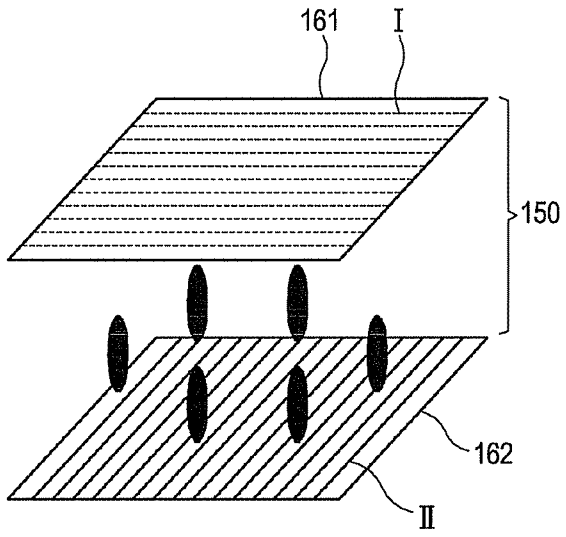
FIGS. 5A and 5B illustrate an exemplary liquid crystal layer of the exemplary display device according to the first exemplary embodiment of the present invention.
Figure 5B:
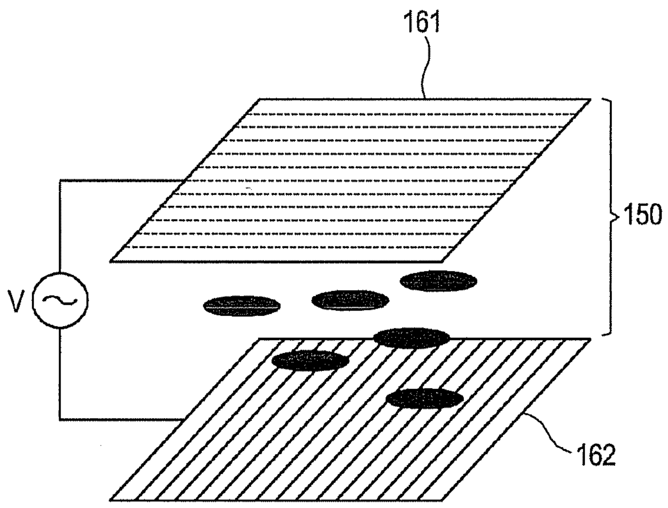

FIGS. 5A and 5B illustrate an exemplary liquid crystal layer of the exemplary display device according to the first exemplary embodiment of the present invention. A liquid crystal layer 150 is interposed between the first substrate and the second substrate (not shown). Polarizing plates 161 and 162 are provided on surfaces of the first and second substrates respectively which do not face the liquid crystal layer 150.

Polarizing axes I and II of the polarizing plates 161 and 162 cross each other, such as extending substantially perpendicular to each other. In the present exemplary embodiment, liquid crystal molecules in the liquid crystal layer 150 are aligned vertically with respect to the substrates under a voltage-off state as shown in FIG. 5A, and horizontally under a voltage-on state as shown in FIG. 5B. As light is not polarized by the liquid crystal molecules under the voltage-off state, light incident in one direction does not pass through the polarizing plates 161 and 162 which have perpendicular polarizing axes with respect to each other. That is, the liquid crystal layer 150 according to the present exemplary embodiment is in a normally black mode which displays black under the voltage-off state.

If a non-image signal is displayed every specific frame, the panel driver 200 may generate a black or gray signal to apply it to the display panel 100. Instead, in an alternative exemplary embodiment, a data signal may not be applied to the pixel rows 130*a* and 130*b* which should be applied with a non-image signal using a property of the foregoing liquid crystal layer 150. In this case, power consumption used for generating and displaying a data signal is reduced.

Figure 6:
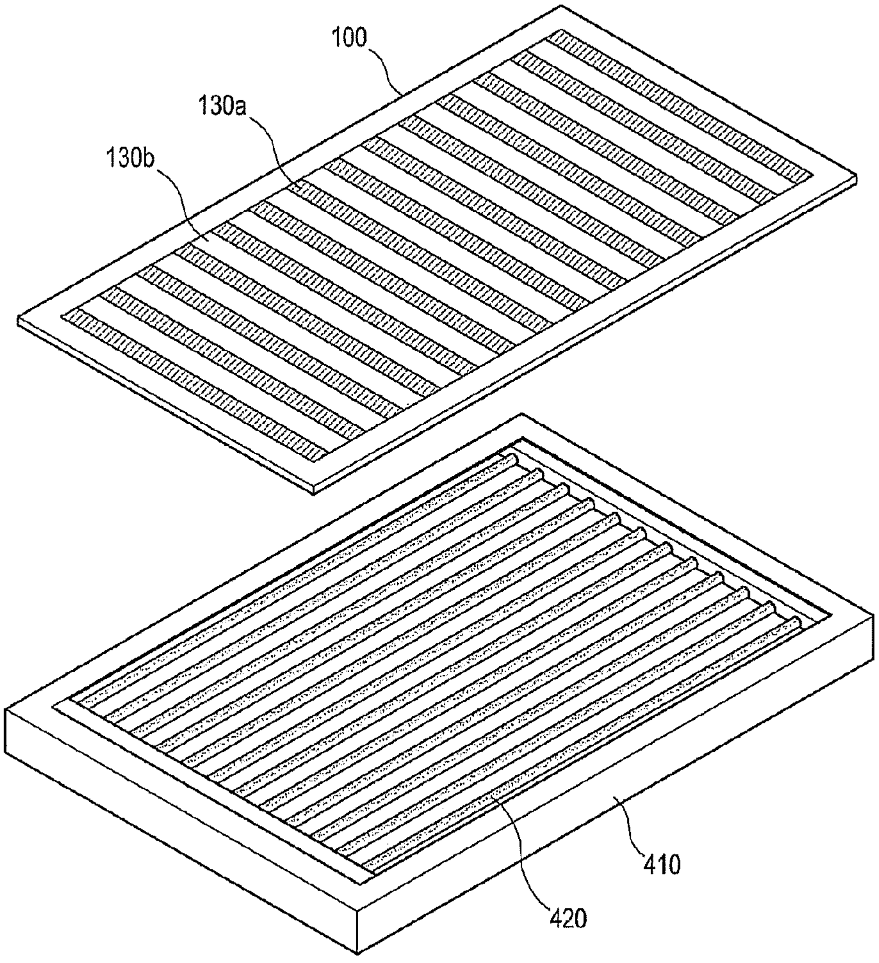
FIG. 6 illustrates an exemplary backlight unit of the exemplary display device according to the first exemplary embodiment of the present invention.

FIG. 6 illustrates an exemplary backlight unit of the exemplary display device according to the first exemplary embodiment of the present invention. In the present exemplary embodiment, since the display panel 100 is provided as an LCD panel including a liquid crystal layer, the display device further includes a backlight unit to provide light to the liquid crystal layer. The backlight unit is disposed behind the display panel 100, such as facing the first substrate of the display panel 100, and includes an accommodating member 410 and a plurality of lamps 420 accommodated in the accommodating member 410. Generally, the backlight unit further includes a supporting member to support the lamps 420, a light control member to adjust light from the lamps 420, etc. which are not illustrated in the drawing.

In the present exemplary embodiment, the lamps 420 extend substantially parallel to a longer-side of the display panel 100. That is, the lamps 420 extend in a substantially perpendicular direction to the pixel rows 130*a* and 130*b* which extend substantially parallel to a shorter-side of the display panel 100. If the lamps 420 extend parallel with the pixel rows 130*a* and 130*b*, then a wavelength of light from the lamps 420 may overlap with a non-image signal, thereby generating a flicker. Therefore, the lamps 420 in the exemplary embodiment of the present invention extend in a perpendicular direction to the pixel rows 130*a* and 130*b* to prevent the flicker.

Figure 7:
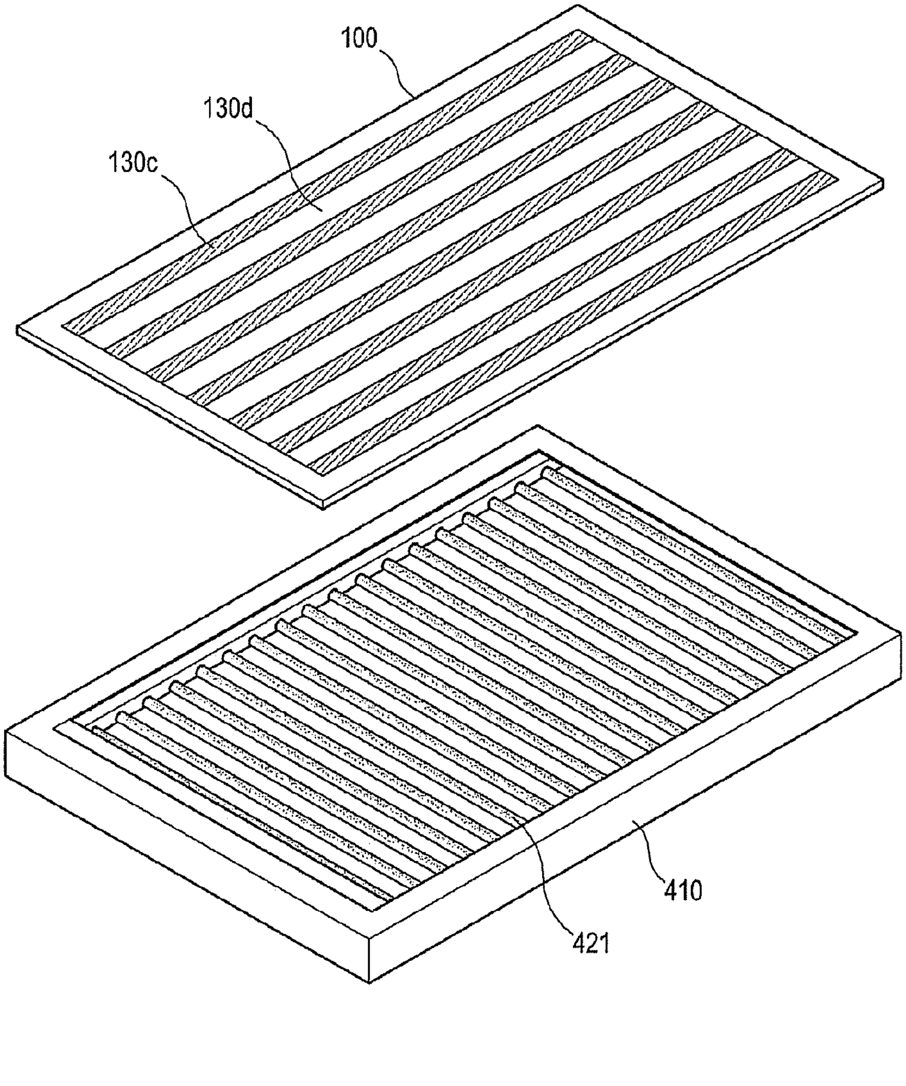
FIG. 7 illustrates an exemplary backlight unit of an exemplary display device according to the second exemplary embodiment of the present invention.

FIG. 7 illustrates an exemplary backlight unit of an exemplary display device according to the second exemplary embodiment of the present invention.

In the display device according to the present exemplary embodiment with reference to FIG. 7, a non-image signal is displayed every pixel lines 130*c* and 130*d* instead of pixel rows, and lamps 421 extend substantially parallel to a shorter-side of a display panel 100, i.e., in a substantially perpendicular direction to the pixel lines 130*c* and 130*d*. Thus, a flicker which may be generated by the lamps 421 is prevented.

In the present invention, an existing memory is used to determine whether image signals are the same and a black or gray voltage is generated to be applied every specific frame, thereby reducing an afterimage sticking due to a still image.

As described above, the present invention provides a display device where an afterimage sticking is improved and a control method of the same.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device comprising:

a display panel which comprises a plurality of pixels in a matrix form;

an image signal comparator which compares image signals corresponding to at least two successive frames and increases a count value if a proportion of the image signals that are the same as each other exceeds a preset critical value; and a panel driver which drives the display panel to display a non-image signal on at least a part of the display panel during at least one frame if the count value reaches a preset instruction value, wherein the count value is accumulated at least once.

2. The display device according to claim 1, wherein the preset instruction value comprises a first instruction value and a second instruction value which is higher than the first instruction value, and the panel driver drives the display panel to display the non-image signal in one of an odd-numbered pixel row and an even-numbered pixel row if the count value reaches the first instruction value and drives the display panel to display the non-image signal in the other of the odd-numbered pixel row and the even-numbered pixel row if the count value reaches the second instruction value.

3. The display device according to claim 2, wherein the display panel comprises a liquid crystal display panel having a substantially rectangular shape, the display device further comprising a plurality of lamps disposed behind the liquid crystal display panel to provide light to the liquid crystal display panel, and the lamps extend in a substantially perpendicular direction to the pixel rows.

4. The display device according to claim 2, wherein the preset instruction value further comprises a third instruction value which is higher than the second instruction value, and the image signal comparator resets the count value if the count value reaches the third instruction value.

5. The display device according to claim 2, wherein the image signal comparator resets the count value after the non-image signal is displayed on the display panel according to the second instruction value.

6. The display device according to claim 1, wherein the preset instruction value comprises a first instruction value and a second instruction value which is higher than the first instruction value, and the panel driver drives the display panel to display the non-image signal in one of an odd-numbered pixel line and an even-numbered pixel line if the count value reaches the first instruction value and drives the display panel to display the non-image signal in the other of the odd-numbered pixel line and the even-numbered pixel line if the count value reaches the second instruction value.

7. The display device according to claim 6, wherein the display panel comprises a liquid crystal display panel having a substantially rectangular shape, the display device further comprising a plurality of lamps disposed behind the liquid crystal display panel to provide light to the liquid crystal display panel, and the lamps extend in a substantially perpendicular direction to the pixel lines.

8. The display device according to claim 1, wherein a polarity of a data signal applied to the pixels is changed differently every frame, and the panel driver drives the display panel to display the non-image signal on the display panel during two successive frames if the count value reaches the preset instruction value.

9. The display device according to claim 1, further comprising a memory which stores image signals corresponding to successive frames.

10. The display device according to claim 9, wherein the memory stores image signals of three successive frames.

11. The display device according to claim 9, wherein the display device displays an image using an overdriving method, an underdriving method, or a pretilt driving method, and the image signals corresponding to successive frames are stored in the memory for the driving method of the display device and for the image signal comparator.

12. The display device according to claim 1, wherein the non-image signal comprises a black or gray signal.

13. The display device according to claim 1, wherein the display panel comprises a liquid crystal layer and is in a normally black mode, and the panel driver does not apply an image signal to at least a part of the display panel during at least one frame if the count value reaches the preset instruction value.

14. A control method of a display device which comprises a display panel which includes a plurality of pixels in a matrix form, the control method comprising:

comparing image signals corresponding to at least two successive frames to determine whether a proportion of the image signals are the same;

increasing a count value if the proportion of image signals that are the same exceeds a preset critical value as a result from comparison; and displaying a non-image signal on at least a part of the display panel during at least one frame wherein the count value is accumulated at least once.

15. The control method according to claim 14, wherein displaying the non-image signal on at least a part of the display panel during at least one frame occurs when the count value reaches a preset instruction value, and the preset instruction value comprises a first instruction value and a second instruction value which is higher than the first instruction value, and displaying the non-image signal comprises displaying the non-image signal in one of an odd-numbered pixel row and an even-numbered pixel row if the count value reaches the first instruction value and displaying the non-image signal in the other of the odd-numbered pixel row and the even-numbered pixel row if the count value reaches the second instruction value.

16. The control method according to claim 15, wherein the preset instruction value further comprises a third instruction value which is higher than the second instruction value, the control method further comprising resetting the count value if the count value reaches the third instruction value.

17. The control method according to claim 15, further comprising resetting the count value after the non-image signal is displayed on the display panel according to the second instruction value.

18. The control method according to claim 14, wherein displaying the non-image signal on at least a part of the display panel during at least one frame occurs when the count value reaches a preset instruction value, and the preset instruction value comprises a first instruction value and a second instruction value which is higher than the first instruction value, and displaying the non-image signal comprises displaying the non-image signal in one of an odd-numbered pixel line and an even-numbered pixel line if the count value reaches the first instruction value and displaying the non-image signal in the other of the odd-numbered pixel line and the even-numbered pixel line if the count value reaches the second instruction value.

19. The control method according to claim 14, wherein displaying the non-image signal comprises displaying a black or gray on at least a part of the display panel.

20. The control method according to claim 14, wherein the display panel comprises a liquid crystal layer and is in a normally black mode, and displaying the non-image signal includes not displaying an image signal on at least a part of the display panel during at least one frame.

* * * * *